United States Patent
Englund et al.

(10) Patent No.: US 11,783,960 B2
(45) Date of Patent: Oct. 10, 2023

(54) POWER CABLE POLYMER COMPOSITION COMPRISING THERMOPLASTIC AND HAVING ADVANTAGEOUS PROPERTIES

(71) Applicant: Borealis AG, Vienna (AT)

(72) Inventors: Villgot Englund, Gothenburg (SE);
Per-Ola Hagstrand, Stenungsund (SE);
Virginie Eriksson, Stenungsund (SE);
Annika Smedberg, Myggenas (SE)

(73) Assignee: BOREALIS AG, Vienna (AT)

( * ) Notice: Subject to any disclaimer, the term of this patent is extended or adjusted under 35 U.S.C. 154(b) by 316 days.

(21) Appl. No.: 17/159,792

(22) Filed: Jan. 27, 2021

(65) Prior Publication Data
US 2021/0217538 A1    Jul. 15, 2021

Related U.S. Application Data

(63) Continuation of application No. 15/536,965, filed as application No. PCT/EP2015/080416 on Dec. 18, 2015, now Pat. No. 10,943,710.

(30) Foreign Application Priority Data

Dec. 19, 2014    (EP) .................................... 14199214

(51) Int. Cl.
| | | |
|---|---|---|
| H01B 9/00 | (2006.01) | |
| H01B 3/44 | (2006.01) | |
| C08F 210/16 | (2006.01) | |
| H01B 9/02 | (2006.01) | |
| H01B 13/14 | (2006.01) | |
| C08F 4/659 | (2006.01) | |
| C08F 4/6592 | (2006.01) | |

(52) U.S. Cl.
CPC ........... *H01B 3/441* (2013.01); *C08F 210/16* (2013.01); *H01B 9/027* (2013.01); *H01B 13/141* (2013.01); *H01B 13/148* (2013.01); *C08F 4/65912* (2013.01); *C08F 4/65916* (2013.01); *C08F 4/65925* (2013.01); *C08F 2410/02* (2013.01)

(58) Field of Classification Search
CPC ...... H01B 3/441; H01B 13/141; C08F 210/16
See application file for complete search history.

(56) References Cited

U.S. PATENT DOCUMENTS

| | | | |
|---|---|---|---|
| 5,326,835 A | 7/1994 | Ahvenainen et al. | |
| 6,255,399 B1 | 7/2001 | Castellani et al. | |
| 6,277,778 B1 | 8/2001 | Leino et al. | |
| 6,316,556 B1 | 11/2001 | Kallio et al. | |
| 6,479,590 B1 | 11/2002 | Ikeda et al. | |
| 6,720,394 B1 | 4/2004 | Kallio et al. | |
| 7,037,872 B2 | 5/2006 | Aubert et al. | |
| 7,166,682 B2 | 1/2007 | Lindroos et al. | |
| 7,341,971 B2 | 3/2008 | Denifl et al. | |
| 7,531,478 B2 | 5/2009 | Denifl et al. | |
| 10,943,710 B2 * | 3/2021 | Englund | C08F 210/16 |
| 2003/0113496 A1 | 6/2003 | Harris et al. | |
| 2006/0219425 A1 * | 10/2006 | Fagrell | H01B 3/441 |
| | | | 174/110 PM |
| 2007/0037939 A1 | 2/2007 | Maaranen et al. | |
| 2007/0049711 A1 | 3/2007 | Kuo et al. | |
| 2011/0290529 A1 | 12/2011 | Pakkanen et al. | |
| 2012/0273253 A1 | 11/2012 | Nilsson et al. | |
| 2013/0081854 A1 | 4/2013 | Englund et al. | |
| 2014/0093732 A1 | 4/2014 | Andersson et al. | |
| 2014/0124238 A1 | 5/2014 | Englund et al. | |
| 2015/0030852 A1 | 1/2015 | Jan et al. | |

FOREIGN PATENT DOCUMENTS

| | | |
|---|---|---|
| EP | 1739103 | 1/2007 |
| EP | 1752462 | 2/2007 |
| JP | 2006111668 | 4/2006 |

OTHER PUBLICATIONS

Kusuma, "*Mg-13 Al Hydrotalcite as halogen scavenger in resins.*", Kisuma Chemicals BV, (2017).
McDaniel, M. P., "*Supported chromium catalysts for ethylene polymerization*", Advances in Catalysts, vol. 33, pp. 47-98, 1985.
McDaniel, M. P., "*Controlling polymer properties with the Phillips chromium catalysts*", Industrial & Engineering Chemistry Research, vol. 27, No. 9, pp. 1559-1564, 1988.
Marsden, C. E., "*The Influence of Silica Support on Polymerisation Catalyst Performance*", Studies in Surface Science and Catalysis, vol. 63, pp. 215-227, 1991.
Thurmer, A., "*Acid scavengers for polyolefins*", Plastics Additives, vol. 1, pp. 43-48, (1998).
Wikipedia, "*Acid Scavengers*", http://en.wikipedia.org/wiki/Polymer_stabilizers.

* cited by examiner

*Primary Examiner* — Gregory Listvoyb
(74) *Attorney, Agent, or Firm* — Diederiks & Whitelaw, PLC.

(57) ABSTRACT

The invention relates to power cable polymer composition which comprises a thermoplastic polyethylene having a chlorine content which is less than X, wherein X is 10 ppm, a power cable, for example, a high voltage direct current (HV DC), a power cable polymer insulation, use of a polymer composition for producing a layer of a power cable, and a process for producing a power cable.

20 Claims, 1 Drawing Sheet

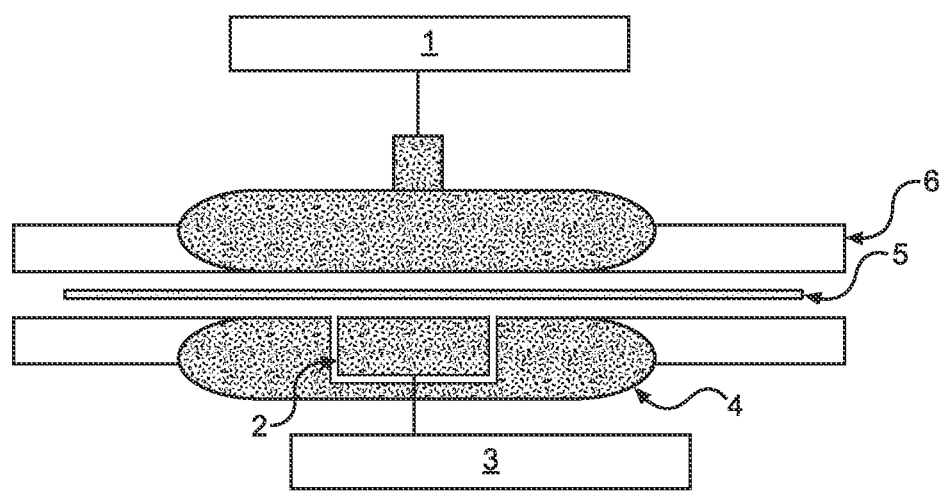

POWER CABLE POLYMER COMPOSITION COMPRISING THERMOPLASTIC AND HAVING ADVANTAGEOUS PROPERTIES

CROSS-REFERENCE TO RELATED APPLICATIONS

This application is a continuation of U.S. application Ser. No. 15/536,965, pending, entitled "Power Cable Polymer Composition Comprising Thermoplastic and Having Advantageous Properties" filed 16 Jun. 2017, which represents the U.S. National Phase of International Application number PCT/EP2015/080416 entitled "Power Cable Polymer Composition Comprising Thermoplastic and Having Advantageous Properties" filed 18 Dec. 2015, which claims priority from and the benefit of European patent application No. 14199214.9 filed on 19 Dec. 2014. The entire contents of these applications are incorporated herein by reference.

FIELD OF INVENTION

The invention relates to a power cable polymer composition which comprises a thermoplastic polyethylene having a chlorine content which is less than X, wherein X is 10 ppm, a power cable, for example, a high voltage direct current (HV DC), a power cable polymer insulation, use of a polymer composition for producing a layer of a power cable, and a process for producing a power cable.

BACKGROUND ART

Polyolefins produced in a high pressure (HP) process are widely used in demanding polymer applications wherein the polymers must meet high mechanical and/or electrical requirements. For instance in power cable applications, particularly in medium voltage (MV) and especially in high voltage (HV) and extra high voltage (EHV) cable applications, the electrical properties of the polymer composition have a significant importance. Furthermore, the electrical properties of importance may differ in different cable applications, as is the case between alternating current (AC) and direct current (DC) cable applications.
Crosslinking of Cables A typical power cable comprises a conductor surrounded, at least, by an inner semiconductive layer, an insulation layer and an outer semiconductive layer, in that order. The cables are commonly produced by extruding the layers on a conductor. The polymer material in one or more of said layers is often crosslinked to improve, e.g., heat and deformation resistance, creep properties, mechanical strength, chemical resistance and abrasion resistance of the polymer in the layer(s) of the cable. In crosslinking reaction of a polymer interpolymer crosslinks (bridges) are primarily formed. Crosslinking can be achieved using e.g. a free radical generating compound, such as a peroxide. Free radical generating agent is typically incorporated to the layer material prior to, or during, the extrusion of the layer(s) on a conductor. After formation of the layered cable, the cable is then subjected to a crosslinking step to initiate the radical formation and thereby crosslinking reaction.

Peroxides are very common free radical generating compounds used e.g. in the polymer industry for said polymer modifications. The resulting decomposition products of peroxides may include volatile by-products which are undesired, since they may have a negative influence on the electrical properties of the cable. Therefore the volatile decomposition products such as methane e.g. where, for example, dicumylperoxide is used, are conventionally reduced to a minimum or removed after crosslinking and cooling step. Such removal step is generally known as a degassing step. The degassing step is time and energy consuming and is thus a costly operation in a cable manufacturing process.

Also the used cable production line and desired production speed can bring limitations to the cable materials especially when producing power cables of a larger size.
Electrical Conductivity The DC electrical conductivity is an important material property for, e.g., insulating materials for high voltage direct current (HV DC) cables. First of all, the temperature and electric field dependence of this property will influence the electric field. The second issue is the fact that heat will be generated inside the insulation by the electric leakage current flowing between the inner and outer semiconductive layers. This leakage current depends on the electric field and the DC electrical conductivity of the insulation. High DC conductivity of the insulating material can even lead to thermal runaway under high stress/high temperature conditions and subsequently breakdown of the insulation system. The DC conductivity must therefore be sufficiently low to avoid thermal runaway.

Accordingly, in HV DC cables, the insulation is heated by the leakage current. For a specific cable design the heating is proportional to the insulation DC conductivity×(electrical field)$^2$. Thus, if the voltage is increased, far more heat will be generated.

EP2548208 discloses polymer compositions for producing layers of a direct current (DC) power cable wherein the polymer composition comprises a polyolefin being a polyethylene or polypropylene.

There are high demands to increase the voltage of a power cable, and particularly of a direct current (DC) power cable, and thus a continuous need to find alternative polymer compositions with reduced DC conductivity. Such polymer compositions should suitably also have good mechanical properties required for demanding power cable embodiments.

BRIEF DESCRIPTION OF THE FIGURE

FIG. 1 shows a schematic picture of a measurement setup used in a DC conductivity method.

DESCRIPTION OF THE INVENTION

An object of the present invention is to provide a power cable polymer composition with advantageous electrical properties, e.g. direct current (DC) low DC electrical conductivity.

The present invention provides a power cable polymer composition, which power cable polymer composition comprises a thermoplastic polyethylene having a chlorine content which is less than X wherein X is 10 ppm.

Unexpectedly, the power cable polymer composition of the present invention has advantageous electrical properties, i.e. the DC electrical conductivity of the power cable polymer composition is reduced, i.e. lowered or low. Namely, the DC electrical conductivity of the power cable polymer composition of the present invention is reduced in comparison to the DC electrical conductivity of conventional polymer material suitable for power cables, while desired mechanical properties are maintained. "Reduced", "lowered" or "low" DC electrical conductivity may herein be used interchangeably, and it means that it is the value obtained from the DC conductivity measurement as described herein under "Determination methods" that is reduced. The low DC electrical conductivity is beneficial for minimising the undesired heat formation in, e.g., an insulation layer of a power cable. Moreover, the power cable polymer composition has, unexpectedly, a low DC electrical conductivity and is produced without any crosslinking by means of a crosslinking agent, such as peroxide. Further, the non-crosslinked power cable polymer composition can still meet e.g. the mechanical properties desired for, for example, an insulation layer of a power cable.

The thermoplastic polyethylenes with very low levels of chlorine, i.e. having a chlorine content which is less than X, (i.e. very low levels of chlorine when compared to, for example, Ziegler Natta polymerised PEs) will not need an acid scavenger to prevent corrosion caused by hydrochloric acid. This is a clear advantage; since acid scavengers typically increase the DC conductivity, which as described above can lead to thermal breakdown of the power cable.

The power cable polymer composition, according to the present benefits from a high chemical cleanliness, hence a low amount of chlorine is beneficial. Furthermore, the low chlorine content also allows omitting the acid scavenger needed in polymer compositions containing higher amount of chlorine. The absence of acid scavenger also positively contributes to a lower DC conductivity of the materials, since a species that can be seen as a charge carrier is not needed to be added to the composition.

Further, said thermoplastic polyethylene may be selected from an ethylene homopolymer or a copolymer of ethylene with one or more comonomer(s).

The difference between a polymer composition and a power cable polymer composition, in accordance with the present invention, is that the power cable polymer composition has a low amount of undesired particles/contaminants, i.e. solid material that is not a part of the composition. Thus, a power cable polymer composition, in accordance with the present invention, has a high level of "physical cleanliness". A low amount of undesired particles/contaminants are a prerequisite for a power cable polymer composition as otherwise the power cable will be prone to electric breakdown. Hence, a general polymer composition without a low and controlled level of undesired particles/contaminants may not work in a power cable. To assure the low amount of undesired contaminants, power cable polymer compositions are generally produced with highly optimised processes and delivered in special packages suited for power cable polymer compositions to withhold the level of contaminants. For HVDC power cables, the concentration of molecular species contributing to the DC electrical conductivity must also be kept on a very low level, i.e. the "chemical cleanliness" must be high. Otherwise, as described above, there is a risk for thermal breakdown of the power cable.

Further, the thermoplastic polyethylene having a chlorine content which is less than X may be produced by polymerisation in the presence of a catalyst, for example, a single site catalyst or a chromium catalyst. The single site catalyst and the chromium catalyst are both conventional coordination catalysts. The group of single site catalysts comprises of metallocene and non-metallocene catalysts.

By conducting polymerisation in the presence of a single site polymerisation catalyst, optionally in, for example, a solution process, said "thermoplastic polyethylene having a chlorine content which is less than X", as described herein, may be produced. The single site catalyst may suitably be a metallocene catalyst. Such catalysts comprise a transition metal compound which contains a cyclopentadienyl, indenyl or fluorenyl ligand. The catalyst contains, e.g., two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups and like. Suitable metallocene compounds are known in the art and are disclosed, among others, in WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

Especially, the metallocene compound must be capable of producing polyethylene having sufficiently high molecular weight. Especially it has been found that metallocene compounds having hafnium as the transition metal atom or metallocene compounds comprising an indenyl or tetrahydroindenyl type ligand often have the desired characteristics.

One example of suitable metallocene compounds is the group of metallocene compounds having zirconium, titanium or hafnium as the transition metal and one or more ligands having indenyl structure bearing a siloxy substituent, such as [ethylenebis(3,7-di(tri-isopropylsiloxy)inden-1-yl)] zirconium dichloride (both rac and meso), [ethylenebis(4,7-di(tri-isopropylsiloxy)inden-1-yl)]zirconium dichloride (both rac and meso), [ethylenebis(5-tert-butyldimethylsiloxy)inden-1-yl)]zirconium dichloride (both rac and meso), bis(5-tert-butyldimethylsiloxy)inden-1-yl)zirconium dichloride, [dimethylsilylenenebis(5-tert-butyldimethylsiloxy)inden-1-yl)]zirconium dichloride (both rac and meso), (N-tert-butylamido)(dimethyl)($\eta^5$-inden-4-yloxy)silanetitanium dichloride and [ethylenebis(2-(tert-butydimethylsiloxy)inden-1-yl)]zirconium dichloride (both rac and meso).

Another example is the group of metallocene compounds having hafnium as the transition metal atom and bearing a cyclopentadienyl type ligand, such as bis(n-butylcyclopentadienyl)hafnium dichloride, bis(n-butylcyclopentadienyl) dibenzylhafnium, dimethylsilylenenebis(n-butylcyclopentadienyl)hafnium dichloride (both rac and meso) and bis[1,2,4-tri(ethyl)cyclopentadienyl]hafnium dichloride.

Still another example is the group of metallocene compounds bearing a tetrahydroindenyl ligand such as bis(4,5,6,7-tetrahydroindenyl)zirconium dichloride, bis(4,5,6,7-tetrahydroindenyl)hafnium dichloride, ethylenebis(4,5,6,7-tetrahydroindenyl)zirconium dichloride, dimethylsilylenebis(4,5,6,7-tetrahydroindenyl)zirconium dichloride.

The single site catalyst typically also comprises an activator. Generally used activators are alumoxane compounds, such as methylalumoxane (MAO), tetraisobutylalumoxane (TIBAO) or hexaisobutylalumoxane (HIBAO). Also boron activators, such as those disclosed in US-A-2007/049711 may be used. The activators mentioned above may be used alone or they may be combined with, for instance, aluminium alkyls, such as triethylaluminium or tri-isobutylaluminium.

Depending on the polymerisation process, the catalyst may be supported. The support may be any particulate support, including inorganic oxide support, for example, silica, alumina or titanium, or a polymeric support, for example, a polymeric support comprising styrene or divinylbenzene. When a supported catalyst is used the catalyst needs to be prepared so that the activity of the catalyst does not suffer. Further, any catalyst residues that remain in a final polymer or product shall also not have any negative impact on the key properties such as, e.g., homogeneity, electrical performance or mechanical properties.

The catalyst may also comprise the metallocene compound on solidified alumoxane or it may be a solid catalyst prepared according to emulsion solidification technology. Such catalysts are disclosed, among others, in EP-A-1539775 or WO-A-03/051934.

Further, by conducting polymerisation in the presence of a chromium polymerisation catalyst, said "thermoplastic polyethylene having a chlorine content which is less than X", as described herein, may be produced.

The chromium catalysts are previously well known, and for detailed description, see M. P. McDaniel, Advances in Catalysis, Vol. 33 (1985), pp 47-98 and M. P. McDaniel, Ind. Eng. Chem. Res., Vol. 27 (1988), pp 1559-1569. Normally, the chromium catalyst is supported by a carrier, preferably silica. The so-called Phillips catalyst, which is based on chromium trioxide on a silica carrier, is a chromium catalyst suitably used in the invention. The Phillips catalyst is generally produced by activating silica together with a so-called master batch of chromium trioxide or chromic acetate. When chromic acetate is used it is oxidised to chromium trioxide, so that the end product is the same no matter whether chromium trioxide or chromic acetate uses. The chromium trioxide forms volatile chromic acid, which is evenly distributed on the silica particles. The 6-valent chromium deposited on the silica particles should then be reduced in order to become catalytically active, and this happens when the chromium comes into contact with the ethylene in the polymerisation reactor.

Further, another type of chromium catalyst that can be used in the present invention is the so-called chromate-type catalyst. When producing such a catalyst, a chromate compound, such as silyl chromate, is deposited on an activated silica carrier. The deposited chromate is reduced by means of an alkoxide, such as an aluminium alkoxide, e.g. diethyl aluminium ethoxide.

The chromium catalyst, in accordance with the present invention, can be modified by titanation and fluoridation, which is in accordance with the prior art (see, for instance, the Preparation of Catalysts, V. G. Oncelet et al., Elsevier Science Publishers, Amsterdam, 1991, pp 215-227, an article by C. 30 E. Marsden).

In an embodiment of the present invention, the power cable polymer composition comprises a thermoplastic polyethylene having a chlorine content which is less than X, as described herein, wherein the thermoplastic polyethylene is selected from the group of single site polyethylenes and chromium catalyst polyethylenes.

The expression "single site polyethylenes" means that the polyethylenes are polymerised in the presence of a single site catalyst which is a conventional coordination catalyst. The group of single site catalysts comprises of metallocene and non-metallocene catalysts.

Further, the expression "chromium catalyst polyethylenes" means that the polyethylenes are polymerised in the presence of a chromium catalyst which is a conventional coordination catalyst.

In a further embodiment of the present invention, the power cable polymer composition comprises a thermoplastic polyethylene having a chlorine content which is less than X, as described herein, wherein the thermoplastic polyethylene is a single site polyethylene.

In still an embodiment of the present invention, the power cable polymer composition comprises a thermoplastic polyethylene having a chlorine content which is less than X, as described herein, wherein the thermoplastic polyethylene is a chromium catalyst polyethylene.

In accordance with an embodiment of the present invention, the power cable polymer composition, as described herein, is a power cable insulation polymer composition. Thus, the power cable polymer composition is in this embodiment especially suitable for insulation in a power cable, as described herein.

Accordingly, when the power cable polymer composition of the present invention is a power cable insulation polymer composition, the power cable polymer composition has special properties typical for a power cable insulation polymer composition.

Special properties of a power cable insulation may be, for example, high level of "physical cleanliness" i.e. low level of undesired particles/contaminants, specialised packaging that facilitates a low risk of contamination from production of the polymer composition until it is extruded onto the conductor when the cable is formed. For HVDC power cables, also the concentration of species contributing to the DC electrical conductivity must be kept on a very low level, i.e. the "chemical cleanliness" must be high. Otherwise, as described above, there is a risk for thermal breakdown of the power cable. Further, the "chemical cleanliness" is high when using a polymer, for example, produced with single site catalyst or chromium catalyst, where there is no need to use any acid scavenger.

In an embodiment of the present invention a power cable polymer composition, as described herein, is provided, wherein the power cable polymer composition is a non-crosslinked power cable polymer composition.

An embodiment of the present invention provides a power cable polymer composition, as described herein, wherein the power cable polymer composition is a thermoplastic power cable polymer composition.

In a further embodiment, the present invention provides a power cable polymer composition, as described herein, wherein the power cable polymer composition comprises a metallocene catalyst polyethylene.

The present invention provides a power cable polymer composition, as described herein, which is suitable for a low voltage (LV), medium voltage (MV), high voltage (HV) and/or extra-high voltage (EHV) power cable.

High voltage direct current (HV DC) is usually considered to be operating at voltages higher than 36 kV and up to 320 kV DC, extra high voltage direct current (EHV DC) is usually considered to be above 320 kV DC, high voltage alternating current (HV AC) is usually considered to be up to 220 kV AC, and extra high voltage alternating current (EHV AC) is usually considered to be above 220 kV AC. Typically a high voltage direct current (HV DC) power cable and extra high voltage direct current (EHV DC) power cable operate at voltages of 40 kV or higher, even at voltages of 50 kV or higher. A power cable operating at very high voltages is known in the art as extra high voltage direct current (EHV DC) power cable which in practice can operate as high as 900 kV, or possibly even higher.

HV and EHV DC power cables require very low DC electrical conductivity of the insulation layer. Otherwise the leakage current flowing through the insulation layer can become too high. Since the leakage current generates heat it can generate thermal breakdown of the power cable. That is why low DC electrical conductivity of the insulation layer is of outmost importance for HV and EHV DC power cables.

In an embodiment of the present invention, a power cable polymer composition, as described herein, is provided being a high voltage (HV) and/or extra-high voltage (EHV) power cable polymer composition.

An embodiment of the present invention provides a power cable polymer composition, as described herein, being an extra-high voltage (EHV) power cable polymer composition.

In still an embodiment of the present invention a power cable polymer composition, as described herein, is provided being high voltage (HV) power cable polymer composition. A further embodiment of the present invention provides a power cable polymer composition, as described herein, being a medium voltage (MV) power cable polymer composition.

Still a further embodiment of the present invention provides a power cable polymer composition, as described herein, which is a low voltage (LV) power cable polymer composition.

The present invention further provides a power cable polymer composition, as described herein, which is a direct current (DC) power cable polymer composition.

Further, the present invention provides a power cable polymer composition, as described herein, being a high voltage direct current (HV DC) and/or an extra high voltage direct current (EHV DC) power cable polymer composition.

Further, the present invention provides a power cable polymer composition, as described herein, direct current (DC) power cable, e.g., for a direct current (DC) power cable operating at voltages higher than 320 kV, for example, up to 525 kV, such as a high voltage direct current (HV DC) or extra high voltage direct current (EHV DC) power cable, as described herein.

Further, the present invention provides a power cable polymer composition, as described herein, being a medium voltage direct current (MV DC) power cable polymer composition.

Still further, the present invention provides a power cable polymer composition, as described herein, which is a low voltage direct current (LV DC) power cable polymer composition.

Accordingly, the low DC electrical conductivity makes the power cable polymer composition of the present invention desirable for power cable applications. Furthermore, the low DC electrical conductivity makes the power cable polymer composition of the present invention very desirable for DC power cable applications. In DC power cable applications, the voltage applied to the power cable is direct current (DC). A DC power cable is defined to be a DC cable transferring energy operating at any DC voltage level, typically operating at DC voltages higher than 1 kV. Moreover, the power cable polymer composition is advantageous in insulation layer material for a power cable, which can be e.g. a low voltage (LV), a medium voltage (MV), a high voltage (HV) or an extra high voltage (EHV) power cable, which terms, as well known, indicate the level of operating voltage. Furthermore, the power cable polymer composition is very advantageous in insulation layer material for a DC power cable, which can be, e.g., a low voltage (LV), a medium voltage (MV), a high voltage (HV) or an extra high voltage (EHV) DC cable, which terms, also well known, indicate the level of operating voltage. The power cable polymer composition may be comprised in an exemplified insulation layer material for a DC power cable operating at voltages higher than 36 kV, such as a HV DC cable. For HV DC cables the operating voltage is defined herein as the electric voltage between ground and the conductor of the high voltage cable.

The present invention is further directed to a power cable as described herein, for example, a direct current (DC) power cable, comprising a conductor surrounded by at least an inner semiconductive layer, an insulation layer and an outer semiconductive layer, in that order, wherein at least one layer, for example, at least an insulation layer, comprises the power cable polymer composition of the present invention, as described herein.

In exemplified embodiments of a power cable as described herein, for example, a direct current (DC) power cable, or for producing a power cable as described herein, for example, a direct current (DC) power cable, the inner semiconductive layer comprises a first semiconductive composition, the insulation layer comprises an insulation composition and an outer semiconductive layer comprises a second semiconductive composition, in that order, and wherein the insulation composition of the insulation layer comprises, for example, consists, of said power cable polymer composition of the present invention, as described herein. The outer semiconductive layer comprises, for example, consists of, a non-crosslinked second semiconductive composition. The inner semiconductive layer, for example, comprises, e.g., consists of, a non-crosslinked first semiconductive composition.

In embodiments of a power cable as described herein, for example, a direct current (DC) power cable, the first semiconductive composition of the inner semiconductive layer and the power cable polymer composition of the invention of the insulation layer are non-crosslinked, and the second semiconductive composition of the outer semiconductive layer is non-crosslinked. Unexpectedly, DC conductivity properties of the final power cable of such embodiments are advantageous for the power cable applications as described herein, and are very advantageous for DC power cable applications, even for HV DC power cable applications and also for EHV DC power cable applications. Further, at the same time desired mechanical properties are maintained with such embodiments for the power cable applications as described herein.

Further, the power cable polymer composition of the present invention, as described herein, is, for example, used in an insulation layer of a high voltage direct current (HV DC) power cable operating at voltages of 40 kV or higher, even at voltages of 50 kV or higher. Furthermore, the power cable polymer composition of the present invention, as described herein, is, for example, used in an insulation layer of a HV DC power cable operating at voltages of 60 kV or higher. Moreover, the power cable polymer composition of the present invention, as described herein, is also highly feasible in very demanding cable applications and can be used in an insulation layer of a HV DC power cable operating at voltages higher than 70 kV. The upper limit may be as high as 1000 kV, or possibly even higher. The power cable polymer composition of the present invention, as described herein, is advantageous for use in a high voltage direct current (HV DC) power cable and extra high voltage direct current (EHV DC) power cable applications operating from 75 to 400 kV, for example, 75 to 350 kV. Moreover, the power cable polymer composition of the present invention, as described herein, invention is also found to be advantageous even in demanding extra high voltage direct current (EHV DC) power cable applications operating from 400 to 850 kV.

HV DC power cable as used herein means either HV DC power cable, for example, with operating at voltages as defined herein, or extra HV DC power cable, for example, with operating at voltages as defined herein. Thus, the term covers independently the operating areas for both HV DC power cable applications and also the EHV DC power cable applications.

The power cable polymer composition of the present invention, as described herein, has, for example, a DC electrical conductivity of 45 fS/m or less, for example, 40 fS/m or less, e.g., 35 fS/m or less, for example, 30 fS/m or less, e.g., 25 fS/m or less, for example, 20 fS/m or less, e.g., 17 fS/m or less, for example, 15 fS/m or less, e.g., 0.01 to 45 fS/m, for example, 0.01 to 40 fS/m, e.g., 0.05 to 45 fS/m, for example, 0.05 to 40 fS/m, e.g., 0.05 to 35 fS/m, for example, 0.05 to 30 fS/m, e.g., 0.05 to 20 fS/m, for example, 0.05 to 10.0 fS/m, e.g., 0.05 to 9.0 fS/m, e.g., 0.05 to 8.0 fS/m, for example, 0.01 to 9.0 fS/m, e.g., 0.01 to 8.0 fS/m, e.g., 0.05 to 5.0 fS/m, e.g., 0.05 to 4.0 fS/m, for example, 0.01 to 3.0 fS/m, or, e.g., 0.01 to 2.0 fS/m, when measured according to the DC conductivity method as described under "Determination Methods".

In embodiments of the present invention, the power cable polymer composition, as described herein, has, for example, a DC electrical conductivity of 10.0 fS/m or less, for example, 9.0 fS/m or less, e.g., 8.0 fS/m or less, for example, 5.0 fS/m or less, for example, 4.0 fS/m or less, e.g., 3.0 fS/m or less, for example, 2.0 fS/m or less, or, e.g., 1.0 fS/m or less, when measured according to the DC conductivity method as described under "Determination Methods".

In still further embodiments of the present invention, the power cable polymer composition, as described herein, has, for example, a DC electrical conductivity of 0.05 to 5.0 fS/m, e.g., 0.05 to 4.0 fS/m, for example, 0.01 to 3.0 fS/m, e.g., 0.01 to 2.0 fS/m, when measured according to the DC conductivity method as described under "Determination Methods".

The thermoplastic polyethylene having a chlorine content which is less than X, in accordance with the present invention, may be a single site polyethylene or a chromium catalyst polyethylene. Said single site polyethylene or chromium catalyst polyethylene may be selected from an ethylene homopolymer or a copolymer of ethylene with one or more comonomer(s). Further, the thermoplastic polyethylene having a chlorine content which is less than X, in accordance with the present invention, belongs to the group of "polyethylenes polymerised in the presence of an olefin polymerisation catalyst", which group is also often called "low pressure polyethylenes" or "low pressure PEs" to distinguish it clearly from LDPEs, "low density polyethylenes".

According to exemplified embodiments, the "thermoplastic polyethylene having a chlorine content which is less than X" is selected from very low density polyethylene (VLDPE) copolymers, linear low density polyethylene (LLDPE) copolymers, medium density polyethylene (MDPE) copolymers or high density polyethylene (HDPE) homopolymers or copolymers.

In one exemplified embodiment, the power cable polymer composition of the present invention comprises a "thermoplastic polyethylene having a chlorine content which is less than X", as described herein, selected from a very low density ethylene copolymer (VLDPE), a linear low density ethylene copolymer (LLDPE), a medium density ethylene copolymer (MDPE) or a high density ethylene homopolymer or copolymer (HDPE). These well known types are named according to their density area. The term VLDPE includes herein PEs which are also known as plastomers and thermoplastic elastomers and covers the density range of from 850 to 909 kg/m$^3$. The LLDPE has a density of from 909 to 930 kg/m$^3$, for example, from 910 to 929 kg/m$^3$, e.g., from 915 to 929 kg/m$^3$. The MDPE has a density of from 930 to 945 kg/m$^3$, for example, 931 to 945 kg/m$^3$. The HDPE has a density of more than 945 kg/m$^3$, for example, more than 946 kg/m$^3$, e.g., 946 to 977 kg/m$^3$, for example, 946 to 965 kg/m$^3$.

Further, the very low density ethylene copolymer (VLDPE) and the linear low density ethylene copolymer (LLDPE) include the PEs being known as plastomers and thermoplastic elastomers. The plastomers and thermoplastic elastomers cover the density range of 850 to 915 kg/m$^3$ (being VLDPE or LLDPE) e.g., 850 to 910 kg/m$^3$ (being VLDPE or LLDPE) or, for example, 850 to 909 kg/m$^3$ (being VLDPE).

In a further embodiment in accordance with the present invention, the "thermoplastic polyethylene having a chlorine content which is less than X", as described herein, may have a density range of 850 to 915 kg/m$^3$, e.g., 850 to 910 kg/m$^3$ or, for example, 850 to 909 kg/m$^3$.

In still a further embodiment in accordance with the present invention, the "thermoplastic polyethylene having a chlorine content which is less than X", as described herein, has a density in the range of 850 to 915 kg/m$^3$, e.g., in the range of 855 to 915 kg/m$^3$, for example, in the range of 860 to 915 kg/m$^3$, e.g., in the range of 850 to 910 kg/m$^3$, for example, in the range of 855 to 910 kg/m$^3$, for example, in the range of 860 to 910 kg/m$^3$, e.g., in the range of 860 to 900 kg/m$^3$, for example, in the range of 860 to 890 kg/m$^3$ or, e.g., in the range of 860 to 880 kg/m$^3$.

A further embodiment in accordance with the present invention, includes a "thermoplastic polyethylene having a chlorine content which is less than X", as described herein, having a density of from 909 to 930 kg/m$^3$, for example, from 910 to 929 kg/m$^3$, e.g., from 915 to 929 kg/m$^3$.

According to exemplified embodiments, the "thermoplastic polyethylene having a chlorine content which is less than X", as described herein, is selected from homopolymers of ethylene and copolymers of ethylene with, for example, minor amounts of at least one $C_3$ to $C_{20}$ alpha-olefin, e.g. $C_3$ to $C_8$ alpha-olefin. The "thermoplastic polyethylene having a chlorine content which is less than X", as described herein, being homopolymers or copolymers of ethylene generally have a density of 935 to 970 kg/m$^3$, for example, of 940 to 960 kg/m$^3$ and the $C_3$ to $C_{20}$ alpha-olefin, e.g. $C_3$ to $C_8$ alpha-olefin, content in the copolymers of ethylene can be about from 0.01% to 5% by weight.

In still a further embodiment a "thermoplastic polyethylene having a chlorine content which is less than X" is included having a density of from 930 to 945 kg/m$^3$, for example, 931 to 945 kg/m$^3$, e.g., more than 945 kg/m$^3$, for example, more than 946 kg/m$^3$, e.g., 946 to 977 kg/m$^3$, for example, 946 to 965 kg/m$^3$.

In an embodiment of the present invention a power cable polymer composition, as described herein, is provided, wherein the power cable polymer composition comprises a chromium catalyst polyethylene with a density of 930 to 949 kg/m$^3$.

The "thermoplastic polyethylene having a chlorine content which is less than X" can be unimodal or multimodal with respect to molecular weight distribution. Further, the "thermoplastic polyethylene having a chlorine content which is less than X" is, for example, selected from a VLDPE copolymer, a LLDPE copolymer, or a MDPE copolymer. Furthermore, the "thermoplastic polyethylene having a chlorine content which is less than X" is, e.g., selected from a VLDPE copolymer or a LLDPE copolymer. Moreover, the "thermoplastic polyethylene having a chlorine content which is less than X" may be multimodal, such as bimodal, with respect to molecular weight distribution. The multimodality contributes to the mechanical and processing properties, such as thermal stress cracking (TSCR).

The "thermoplastic polyethylene having a chlorine content which is less than X", which is a low pressure polyethylene (PE), can be unimodal or multimodal with respect to molecular weight distribution (MWD=Mw/Mn). Generally, a polymer comprising at least two polymer fractions, which have been produced under different polymerisation conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

A "thermoplastic polyethylene having a chlorine content which is less than X", as described herein, being a multimodal low pressure PE, usable in the power cable polymer composition in an embodiment of the present invention, comprises a lower weight average molecular weight (LMW) component (A) and a higher weight average molecular weight (HMW) component (B). Said LMW component has a lower molecular weight than the HMW component.

Naturally, the "thermoplastic polyethylene having a chlorine content which is less than X" being the multimodal low pressure PE may, in addition or alternatively to multimodality with respect to MWD, be multimodal with respect to density and comonomer content. I.e. the LMW and HMW components may have different comonomer content or density, or both.

Further, the "thermoplastic polyethylene having a chlorine content which is less than X" may independently have a MWD of at least 2.0, for example, at least 2.5, e.g., at least 2.9, e.g., 3 to 30, for example, from 3.3 to 25, e.g., 3.5 to 20, for example, 3.5 to 15. A unimodal PE may typically have a MWD of 3.0 to 10.0.

The "thermoplastic polyethylene having a chlorine content which is less than X" has, for example, when being a single site polyethylene, an $MFR_2$ of up to 1200 g/10 min, e.g., up to 1000 g/10 min, for example, up to 500 g/10 min, e.g., up to 400 g/10 min, for example, up to 300 g/10 min, e.g., up to 200 g/10 min, for example, up to 150 g/10 min, e.g., 0.01 to 100, for example, 0.01 to 50 g/10 min, e.g., 0.01 to 40.0 g/10 min, for example, from 0.05 to 30.0 g/10 min, e.g., from 0.1 to 20.0 g/10 min, e.g., from 0.2 to 15.0 g/10 min.

Further, the "thermoplastic polyethylene having a chlorine content which is less than X" has, when being, for example, a single site polyethylene, an $MFR_2$ (ISO 1133; 190° C.; 2.16 kg), as described herein, suitably, in the range of 0.5-50 g/10 min, e.g., in the range of 0.5-40 g/10 min and, for example, in the range of 0.5-35 g/min.

The "thermoplastic polyethylene having a chlorine content which is less than X" has, for example, when being a chromium catalyst polyethylene, for example, an $MFR_{21}$ of up to 120 g/10 min, e.g., up to 100 g/10 min, for example, up to 80 g/10 min, e.g., up to 70 g/10 min, for example, up to 65 g/10 min, e.g., 0.01 to 100, for example, 0.01 to 80 g/10 min, e.g., 0.01 to 70.0 g/10 min, or, for example, from 0.05 to 65.0 g/10 min.

Further, "thermoplastic polyethylene having a chlorine content which is less than X" has, for example, when being a chromium catalyst polyethylene, for example, an $MFR_2$ of, for example up to 20 g/10 min, e.g., up to 10 g/10 min, for example, up to 5.0 g/10 min, e.g., up to 4.0 g/10 min, for example, up to 3.0 g/10 min, e.g., up to 2.0 g/10 min, for example, up to 1.5 g/10 min, e.g., 0.01 to 10, for example, 0.01 to 5.0 g/10 min, e.g., 0.01 to 4.0 g/10 min, for example, from 0.05 to 3.0 g/10 min, e.g., from 0.1 to 2.0 g/10 min or, e.g., from 0.2 to 1.5 g/10 min.

Furthermore, said "thermoplastic polyethylene having a chlorine content which is less than X", as described herein, has, suitably, a glass transition temperature Tg (measured with DMTA according to ISO 6721-7) of below −25° C., for example, below −30° C., e.g., below −35° C.

Further, when said "thermoplastic polyethylene having a chlorine content which is less than X", as described herein, is a copolymer of ethylene and a $C_4$-$C_{10}$ alpha-olefin, in accordance with the present invention, has an ethylene content from 50 to 95 wt %, e.g., from 55 to 90 wt % and, for example, from 60 to 85 wt %.

Suitable "thermoplastic polyethylene having a chlorine content which is less than X", according to the present invention, as comprised in the power cable polymer composition of the present invention is as such well known and can be e.g. commercially available or, alternatively, can be produced according to or analogously to conventional polymerisation processes which are well documented in the literature.

Further, the "thermoplastic polyethylene having a chlorine content which is less than X", as described herein, can, suitably, be any copolymer of ethylene and propylene or ethylene and $C_4$-$C_{10}$ alpha olefin having the above defined properties. For example, the origin of the "thermoplastic polyethylene having a chlorine content which is less than X", when it is a thermoplastic polyethylene polymerised in a solution process in the presence of a single site catalyst, as described herein, may be commercially available copolymers of copolymer of ethylene and propylene or ethylene and a $C_4$-$C_{10}$ alpha-olefin, e.g. from *Borealis* Plastomers (NL) under the tradename Queo, from DOW Chemical Corp (USA) under the tradename Engage, or from Mitsui under the tradename Tafmer.

The "thermoplastic polyethylene having a chlorine content which is less than X" being the low pressure PE can be a copolymer of ethylene with one or more comonomer(s). Comonomer as used herein means monomer units other than ethylene, which are copolymerisable with ethylene.

An embodiment of the present invention provides a power cable polymer composition, as described herein, wherein the "thermoplastic polyethylene having a chlorine content which is less than X", as described herein, is a very low density polyethylene (VLDPE) or a linear low density polyethylene (LLDPE).

Still a further embodiment of the present invention provides a power cable polymer composition, as described herein, wherein the "thermoplastic polyethylene having a chlorine content which is less than X", as described herein, is a medium density polyethylene (MDPE).

A further embodiment of the present invention provides a power cable polymer composition, as described herein, wherein the "thermoplastic polyethylene having a chlorine content which is less than X", as described herein, is a high density polyethylene (HDPE).

The "thermoplastic polyethylene having a chlorine content which is less than X", as described herein, is, for example, a copolymer of ethylene with one or more olefin comonomer(s), for example, with at least $C_{3-20}$ alpha olefin, e.g., with at least one $C_{4-12}$ alpha-olefin, for example, with at least one $C_{4-8}$ alpha-olefin, e.g. with 1-butene, 1-hexene or 1-octene.

In a further embodiment of the present invention, said "thermoplastic polyethylene having a chlorine content which is less than X", as described herein, is a single site copolymer of ethylene and propylene or $C_4$-$C_{10}$ alpha olefin.

In still an embodiment of the present invention, said "thermoplastic polyethylene having a chlorine content which is less than X" is a single site copolymer of ethylene and $C_4$-$C_{10}$ alpha olefin, as described herein.

Further, $C_4$-$C_{10}$ alpha-olefins include 1-buten, 1-hexene and 1-octene, e.g., butene or octene and, for example, octene.

Furthermore, copolymers of ethylene and 1-octene are, for example, used.

The amount of comonomer(s) present in said "thermoplastic polyethylene having a chlorine content which is less than X" may be 0.1 to 15 mol-%, typically 0.25 to 10 mol-%.

Further, the "thermoplastic polyethylene having a chlorine content which is less than X", as described herein, being the low pressure PE copolymer can be a binary copolymer, i.e. such PE copolymer may contain ethylene and one comonomer, or a terpolymer, i.e such PE copolymer may contain ethylene and two or three comonomers.

An exemplified power cable polymer composition consists of the "thermoplastic polyethylene having a chlorine content which is less than X" as the only polymer component. The expression means, in this specific embodiment, that the power cable polymer composition does not contain further polymer components but the "thermoplastic polyethylene having a chlorine content which is less than X" as the sole polymer component. However, it is to be understood herein that the power cable polymer composition, also in this specific embodiment, may comprise further components other than the "thermoplastic polyethylene having a chlorine content which is less than X", such as additives which may optionally be added in a mixture with a carrier polymer, i.e. in so called master batch.

Thus, the DC electrical conductivity of the power cable polymer composition of the present invention is surprisingly low. Furthermore, the power cable polymer composition of the present invention may in an embodiment be non-crosslinked, and thus then it comprises no crosslinking agent. The power cable polymer composition of the present invention, which is non-crosslinked, has a very advantageous low DC electrical conductivity. Furthermore, the power cable polymer composition, in this embodiment of the present invention, does not need to be crosslinked for use in a layer, for example, in an insulation layer, of a DC power cable. In this embodiment the prior art drawbacks relating to the use of a crosslinking agent in cable layer can be avoided. Naturally, this embodiment enables to simplify the cable production process.

In further embodiments of the present invention, the power cable polymer composition, as described herein, comprises a thermoplastic polyethylene having a chlorine content which is less than X, wherein X is 9, 8, 7, 6 or, alternatively, 5 ppm.

In a further embodiment of the present invention, the power cable polymer composition, as described herein, comprises a thermoplastic polyethylene having a chlorine content which is less than X, wherein X is 5.0 ppm.

In still further embodiments of the present invention, the power cable polymer composition, as described herein, comprises a thermoplastic polyethylene having a chlorine content which is less than X, wherein X is 4.5, 4.0, 3.5, 3.0, 2.5, 2.0, 1.5 or, alternatively, 1.0 ppm.

In a further embodiment of the present invention, the power cable polymer composition, as described herein, comprises a thermoplastic polyethylene having a chlorine content which is less than X, wherein X is 2.0 ppm.

In further embodiments of the present invention, the power cable polymer composition, as described herein, comprises a thermoplastic polyethylene having a chlorine content which is less than X, wherein X is 1.9, 1.7, 1.5, 1.3 or, alternatively, 1.1 ppm.

In still further embodiments of the present invention, the power cable polymer composition, as described herein, comprises a thermoplastic polyethylene having a chlorine content which is less than X, wherein X is 1.5 or, alternatively, 1.1 ppm.

In further embodiments of the present invention, the power cable polymer composition, as described herein, comprises a thermoplastic polyethylene having a chlorine content which is less than X, wherein X is 1.8, 1.6, 1.4 or, alternatively, 1.2 ppm.

In still further embodiments of the present invention, the power cable polymer composition, as described herein, comprises a thermoplastic polyethylene having a chlorine content which is less than X, wherein X is 1.4 or, alternatively, 1.2 ppm.

In a further embodiment of the present invention, the power cable polymer composition, as described herein, comprises a thermoplastic polyethylene having a chlorine content which is less than X, wherein X is 1.0 ppm.

In further embodiments of the present invention, the power cable polymer composition, as described herein, comprises a thermoplastic polyethylene having a chlorine content which is less than X, wherein X is 0.9, 0.8, 0.7, 0.6 or, alternatively, 0.5 ppm.

In still further embodiments of the present invention, the power cable polymer composition, as described herein, comprises a thermoplastic polyethylene having a chlorine content which is less than X, wherein X is 0.7 or, alternatively, 0.5 ppm.

In a further embodiment of the present invention, the power cable polymer composition, as described herein, comprises a thermoplastic polyethylene having a chlorine content which is less than X, wherein X is 0.5 ppm.

"Without crosslinking", "not crosslinked" or "non-crosslinked", as may be used herein, means that no crosslinking agent is added to the power cable polymer composition for crosslinking the composition. Similarly, "comprises no crosslinking agent" means herein the power cable polymer composition does not comprise any crosslinking agent which would have been added to crosslink the composition.

Additionally, the power cable polymer composition of the present invention may contain, in addition to the "thermoplastic polyethylene having a chlorine content which is less than X", further component(s) such as polymer component(s) and/or additive(s), for example, additive(s), such as any of antioxidant(s), stabiliser(s), processing aid(s), flame retardant additive(s), water tree retardant additive(s), acid or ion scavenger(s), inorganic filler(s) and voltage stabilizer(s), as known in the polymer field. The power cable polymer composition of the present invention comprises, for example, conventionally used additive(s) for W&C applications, such as one or more antioxidant(s). The used amounts of additives are conventional and well known to a skilled person.

As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned.

It is exemplified that the power cable polymer composition of the present invention is used for producing an insulation layer. Further, the power cable polymer composition of the present invention may be without, i.e. does not comprise, a carbon black. Furthermore, the power cable polymer composition of the present invention may be without, i.e. does not comprise, flame retarding additive(s) in such amounts conventionally used for acting as "flame retardants", e.g. a metal hydroxide containing additives in flame retarding amounts.

The exemplified embodiments, properties and subgroups herein of the power cable polymer composition of the present invention are independently generalisable so that they can be used in any order or combination to further define the exemplified embodiments of the power cable polymer composition and the power cable produced using the power cable polymer composition.

When the "thermoplastic polyethylene having a chlorine content which is less than X", as described herein, is a single site polyethylene, it is produced by polymerisation in the presence of a single site catalyst.

The single site catalyst can be selected from, well known, single site catalysts, which term comprises well known metallocene and non-metallocene catalysts. It is evident for a skilled person that the catalyst system comprises a co-catalyst. Further, suitable conventional polymerisation processes are well documented in the literature.

Further, the single site catalyst may be as described herein.

The single site polyethylene being a unimodal low pressure PE can be produced by a single stage polymerisation in a single reactor in a well known and documented manner. The single site polyethylene being a multimodal (e.g. bimodal) low pressure PE can be produced e.g. by blending mechanically together two or more separate polymer components or, for example, by in-situ blending during the polymerisation process of the components. Both mechanical and in-situ blending are well known in the field.

Accordingly, the exemplified in-situ blending means the polymerisation of the polymer components under different polymerisation conditions, e.g. in a multistage polymerisation reactor system, i.e. two or more stage, or by the use of two or more different single site polymerisation catalysts in a one stage polymerisation, or by use a combination of multistage polymerisation and two or more different single site polymerisation catalysts. In the multistage polymerisation process the polymer is polymerised in a process comprising at least two polymerisation stages. Each polymerisation stage may be conducted in at least two distinct polymerisation zones in one reactor or in at least two separate reactors. Furthermore, the multistage polymerisation process may be conducted in at least two cascaded polymerisation zones. Polymerisation zones may be connected in parallel, or, for example, the polymerisation zones operate in cascaded mode.

The polymerisation zones may operate in bulk, slurry, solution, or gas phase conditions or in any combinations thereof. In an exemplified multistage process a first polymerisation step is carried out in at least one slurry, e.g. loop, reactor and the second polymerisation step in one or more gas phase reactors. One exemplified multistage process is described in EP517868.

In general, the temperature in the single site polyethylene polymerisation, being the low pressure PE polymerisation, is typically from 50 to 115° C., e.g., 60 to 110° C. The pressure is from 1 to 150 bar, for example, 10 to 100 bar. The precise control of polymerisation conditions can be performed by using different types of catalyst and using different comonomer and/or hydrogen feeds.

Further, a single site polyethylene, as described herein, can be prepared by known processes, in a one stage or two stage polymerisation process, utilising solution polymerisation in the presence of a single-site catalyst, e.g. metallocene or constrained geometry catalysts, known to the person skilled in the art.

For example, said single site polyethylene, as described herein, may be prepared by a one stage or two stage solution polymerisation process in a high temperature solution polymerisation process at temperatures higher than 100° C.

Such process is essentially based on polymerising the monomer and a suitable comonomer in a liquid hydrocarbon solvent in which the resulting polymer is soluble. The polymerisation is carried out at a temperature above the melting point of the polymer, as a result of which a polymer solution is obtained. This solution is flashed in order to separate the polymer from the unreacted monomer and the solvent. The solvent is then recovered and recycled in the process.

Furthermore, the solution polymerisation process is a high temperature solution polymerisation process using a polymerisation temperature of higher than 100° C. The polymerisation temperature is, for example, at least 110°, e.g., at least 150° C. The polymerisation temperature can, for example, be up to 250° C.

The pressure in such a solution polymerisation process is, for example, in a range of 10 to 100 bar, e.g., 15 to 100 bar and, for example, 20 to 100 bar.

The liquid hydrocarbon solvent used is, for example, a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. For example, unsubstituted $C_{6-10}$-hydrocarbon solvents are used.

A known solution technology suitable for the process to prepare a single site polyethylene in a solution process is the COMPACT technology.

Furthermore, the "thermoplastic polyethylene having a chlorine content which is less than X" may also be a chromium catalyst polyethylene, which thermoplastic polyethylene is polymerised in the presence of a chromium polymerisation catalyst.

The chromium catalyst polyethylene being a unimodal low pressure PE can be produced by a single stage polymerisation in a single reactor in a well known and documented manner. The chromium catalyst polyethylene (CrPE) being a multimodal (e.g. bimodal) low pressure PE can be produced e.g. by blending mechanically together two or more separate polymer components or, for example, by in-situ blending during the polymerisation process of the components. Both mechanical and in-situ blending are well known in the field.

Accordingly, the exemplified in-situ blending means the polymerisation of the polymer components under different polymerisation conditions, e.g. in a multistage polymerisation reactor system, i.e. two or more stage, or by the use of two or more different chromium polymerisation catalysts, including multi- or dual site catalysts, in a one stage polymerisation, or by use a combination of multistage polymerisation and two or more different chromium polymerisation catalysts. In the multistage polymerisation process the polymer is polymerised in a process comprising at least two polymerisation stages. Each polymerisation stage may be conducted in at least two distinct polymerisation zones in one reactor or in at least two separate reactors. Furthermore, the multistage polymerisation process may be conducted in at least two cascaded polymerisation zones. Polymerisation zones may be connected in parallel, or, for example, the polymerisation zones operate in cascaded mode.

The polymerisation zones may operate in bulk, slurry, solution, or gas phase conditions or in any combinations thereof. In an exemplified multistage process a first polymerisation step is carried out in at least one slurry, e.g. loop, reactor and the second polymerisation step in one or more gas phase reactors. One exemplified multistage process is described in EP517868.

In general, the temperature in the chromium catalyst polyethylene polymerisation, being the low pressure PE polymerisation, is typically from 50 to 115° C., e.g., 60 to 110° C. The pressure is from 1 to 150 bar, for example, 10 to 100 bar. The precise control of polymerisation conditions can be performed by using different types of catalyst and using different comonomer and/or hydrogen feeds.

Prepolymerisation may precede the actual polymerisation step(s) of the "thermoplastic polyethylene having a chlorine content which is less than X", as well known in the field.

The obtained "thermoplastic polyethylene having a chlorine content which is less than X", being a low pressure PE polymerisation product, may be compounded in a known manner and optionally with additive(s) and pelletised for further use.

End Uses and End Applications

The present invention discloses a power cable, for example, a high voltage direct current (HV DC) and/or an extra high voltage direct current (EHV DC) power cable, which power cable comprises a thermoplastic polyethylene having a chlorine content which is less than X, wherein X is as defined herein; or which power cable comprises a polymer composition being, or comprising, the power cable polymer composition as described herein.

A further embodiment of the present invention discloses a power cable, for example, a high voltage direct current (HV DC) and/or an extra high voltage direct current (EHV DC) power cable, which power cable comprises a polymer composition being, or comprising, the power cable polymer composition as described herein.

Still a further embodiment of the present invention discloses a power cable polymer insulation, for example, a high voltage direct current (HV DC) and/or an extra high voltage direct current (EHV DC) power cable insulation, which power cable insulation comprises a thermoplastic polyethylene having a chlorine content which is less than X, wherein X is as defined herein; or which power cable insulation comprises a polymer composition being, or comprising, the power cable polymer composition as described herein.

Even a further embodiment of the present invention discloses a power cable polymer insulation, for example, a high voltage direct current (HV DC) and/or an extra high voltage direct current (EHV DC) power cable insulation, which power cable insulation comprises a polymer composition being, or comprising, the power cable polymer composition as described herein.

The power cable polymer composition of the present invention, as described herein, or a polymer composition comprising the power cable polymer composition as described herein, may be used for producing an insulation, e.g. an insulation layer, of a power cable as described herein, e.g. a direct current (DC) power cable, as described herein.

The invention further provides a power cable, e.g. a direct current (DC) power cable, comprising a conductor which is surrounded at least by an inner semiconductive layer, an insulation layer and an outer semiconductive layer, in that order, wherein at least one layer, for example, at least the insulation layer, comprises, for example, consists of, a power cable polymer composition of the present invention as described herein, or a polymer composition comprising the power cable polymer composition as described herein.

Accordingly, the inner semiconductive layer of the power cable comprises, for example, consists of, a first semiconductive composition, the insulation layer comprises, for example, consists of, an insulation composition, and the outer semiconductive layer comprises, e.g., consists of, a second semiconductive composition. Thus, the insulation composition comprises, e.g., consists of, the power cable polymer composition of the present invention, or of a polymer composition comprising the power cable polymer composition as described herein.

The first and the second semiconductive compositions can be different or identical and comprise a polymer(s) which is, for example, a polyolefin or a mixture of polyolefins and a conductive filler, e.g., carbon black. Suitable polyolefin(s) are e.g. polyethylene produced in a low pressure process or a polyethylene produced in a HP process (LDPE). The general polymer description, as given herein, in relation to the thermoplastic polyethylene having a chlorine content which is less than X, as well as, well known descriptions for further low pressure polyethylenes and low density polyethylenes, here refer to, for example, EP2548208, may apply for the suitable polymers for semiconductive layers. The carbon black can be any conventional carbon black used in the semiconductive layers of a power cable as described herein, e.g. a DC power cable, for example, in the semiconductive layer of a DC power cable. Further, the carbon black may have one or more of the following properties: a) a primary particle size of at least 5 nm which is defined as the number average particle diameter according ASTM D3849-95a, dispersion procedure D b) iodine number of at least 30 mg/g according to ASTM D1510, c) oil absorption number of at least 30 ml/100 g which is measured according to ASTM D2414. Non-limiting examples of carbon blacks are e.g. acetylene carbon black, furnace carbon black and Ketjen carbon black, for example, furnace carbon black and acetylene carbon black. Further, the power cable polymer composition may comprise 10 to 50 wt % carbon black, based on the weight of the semiconductive composition.

In an exemplified embodiment of a power cable, e.g. a direct current (DC) power cable, the inner semiconductive layer comprises a first semiconductive composition, the insulation layer comprises an insulation composition and an outer semiconductive layer comprises a second semiconductive composition, in that order, and wherein the insulation composition of the insulation layer comprises, for example, consists, of said power cable polymer composition of the present invention, as described herein. The outer semiconductive layer comprises, for example, consists of, a non-crosslinked second semiconductive composition. Furthermore, the inner semiconductive layer may, comprise, for example, consists of, a non-crosslinked first semiconductive composition.

Naturally, the further exemplified subgroups of the properties herein, further properties, variants and embodiments as defined herein for the power cable polymer composition of the present invention, as described herein, apply similarly to the DC power cable, of the present invention.

The term "conductor" means herein that the conductor comprises one or more wires. Moreover, the cable may comprise one or more such conductors. Further, the conductor may be a DC electrical conductor and comprise one or more metal wires.

It is exemplified that the power cable polymer composition of the insulation layer of the present invention, consists of the "thermoplastic polyethylene having a chlorine content which is less than X", in accordance with the present invention, as the only polymer component. Accordingly, in this embodiment the power cable polymer composition of the present invention comprises no other polymer component(s).

As well known the cable can optionally comprise further layers, e.g. layers surrounding the insulation layer or, if present, the outer semiconductive layers, such as screen(s), a jacketing layer(s), other protective layer(s) or any combinations thereof.

The present invention provides a process for producing a power cable, e.g. a direct current (DC) power cable, which process comprises use of a thermoplastic polyethylene having a chlorine content which is less than X, wherein X is as described herein, or of a polymer composition being, or comprising, the power cable polymer composition as described herein.

The invention also provides a process for producing a power cable, e.g. a direct current (DC) power cable, wherein the process comprises the steps of applying on a conductor, for example, by (co)extrusion, an inner semiconductive layer comprising a first semiconductive composition, an insulation layer comprising an insulation composition and an outer semiconductive layer comprising a second semiconductive composition, in that order, wherein the insulation composition of the insulation layer, comprises, e.g., consists of, a power cable polymer composition of the present invention, as described herein.

Further, a power cable, e.g. a direct current (DC) power cable, may be produced, wherein the process comprises the steps of (a)
providing and mixing, for example, meltmixing in an extruder, a first semiconductive composition comprising a polymer, a carbon black and optionally further component(s) for the inner semiconductive layer, providing and mixing, for example, meltmixing in an extruder the power cable polymer composition of the present invention, providing and mixing, for example, meltmixing in an extruder, a second semiconductive composition which comprises a polymer, a carbon black and optionally further component(s) for the outer semiconductive layer, and (b) applying on a conductor, for example, by coextrusion,
a meltmix of the first semiconductive composition obtained from step (a) to form the inner semiconductive layer, a meltmix of power cable polymer composition of the invention obtained from step (a) to form the insulation layer, and a meltmix of the second semiconductive composition obtained from step (a) to form the outer semiconductive layer.

Melt mixing means mixing above the melting point of at least the major polymer component(s) of the obtained mixture and is carried out for example, without limiting to, in a temperature of at least 15° C. above the melting or softening point of polymer component(s).

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads. For instance a triple extrusion head can be used for forming three layers. In case a layer is formed using more than one extrusion heads, then for instance, the layers can be extruded using two extrusion heads, the first one for forming the inner semiconductive layer and the inner part of the insulation layer, and the second head for forming the outer insulation layer and the outer semiconductive layer.

As well known, the power cable polymer composition of the present invention and the optional and exemplified first and second semiconductive compositions can be produced before or during the cable production process. Moreover the power cable polymer composition of the present invention and the optional and exemplified first and second semiconductive composition can each independently comprise part or all of the component(s) of the final composition, before introducing to the (melt) mixing step (a) of the cable production process.

Further, the power cable polymer composition of the present invention and, optionally, the optional first and second semiconductive composition are suitably provided to the cable production process in form of powder, grain or pellets. Pellets mean herein generally any polymer product which is formed from reactor-made polymer (obtained directly from the reactor) by post-reactor modification to solid polymer particles. A well-known post-reactor modification is pelletising a meltmix of a polymer product and optional additive(s) in a pelletising equipment to solid pellets. Pellets can be of any size and shape. Moreover, the power cable polymer composition of the present invention can be combined in a powder, grain or pellet product, which thus contains a solid polymer mixture of said power cable polymer composition.

The (melt) mixing step (a) of the provided power cable polymer composition of the invention and of the exemplified first and second semiconductive compositions is, for example, carried out in a cable extruder. The step (a) of the cable production process may optionally comprise a separate mixing step, e.g. in a mixer arranged in connection and preceding the cable extruder of the cable production line. Mixing in the preceding separate mixer can be carried out by mixing with or without external heating (heating with an external source) of the component(s).

Any optional exemplified additive(s) can be added to any power cable polymer composition as such or as a mixture with a carrier polymer, i.e. in a form of so-called master batch.

In one exemplified embodiment of the cable production process a power cable, e.g. a direct current (DC) power cable, is produced, wherein the insulation layer comprises, e.g., consists of, a power cable polymer composition of the present invention.

The processing temperatures and devices are well known in the art, e.g. conventional mixers and extruders, such as single or twin screw extruders, are suitable for the process of the invention.

The advantages of the exemplified embodiment of having the inner semiconductive layer and the insulation layer comprising, for example, consisting of a power cable polymer composition, of the present invention, in combination with an outer semiconductive layer comprising, for example, consisting of a polymeric composition, as defined herein are as follows:
- Optimal electrical performance of the insulation system of the HV DC cable.
- The connection of cables may be facilitated due to non-crosslinked thermoplastic power cable insulation polymer composition and thermoplastic power cable.
- No need to wait and allow the heat to transfer through the insulation system, since no crosslinking reaction is needed. The overall production efficiency is improved, especially in HV applications with thick insulation system.
- Robust high speed extrusion possible leading to longer stable production periods at higher extrusion speed and quality due to no or very low risk to scorching (undesired premature crosslinking) in the inner semiconductive and insulation layers. In principle this means that the extruder can be run for longer times. As a result longer maximum cable lengths can be produced requiring fewer joints in the power cable system.
- Degassing step can be omitted, and thus accelerate the overall cable production process, since no undesired by-products, i.e. decomposition products, formed from any crosslinking agent need to be removed. In addition, no gradient in peroxide by-products will exist in the cable. As a result the electrical properties of the cable will be more controlled, which may lead to an overall better electrical performance.
- In-line jacketing can be done as no need to degas cable.

Exemplified DC power cables, of the present invention, are high voltage direct current (HV DC) power cable or extra high voltage direct current (EHV DC) power cable. Further, said high voltage direct current (HV DC) power cable, or extra high voltage direct current (EHV DC) power cable, may operate at voltages as defined herein.

The thickness of the insulation layer of the power cable, e.g. the direct current (DC) power cable, for example, the HV DC power cable, is typically 2 mm or more, for example, at least 3 mm, for example, at least 5 to 100 mm, for example, from 5 to 50 mm, and conventionally 5 to 40 mm, e.g. 5 to 35 mm, when measured from a cross section of the insulation layer of the cable. The thickness of the inner and outer semiconductive layers is typically less than that of the insulation layer, and in, for example, HV DC power cables can be e.g. more than 0.1 mm, such as from 0.3 up to 20 mm, 0.3 to 10 of inner semiconductive and outer semiconductive layer. The thickness of the inner semiconductive layer is for example, 0.3-5.0 mm, e.g., 0.5-3.0 mm, for example, 0.8-2.0 mm. The thickness of the outer semiconductive layer is, for example, 0.3 to 10 mm, such as 0.3 to 5 mm, e.g., 0.5 to 3.0 mm, for example, 0.8-3.0 mm. It is evident for and within the skills of a skilled person that the thickness of the layers of the power cable, e.g. the direct current (DC) power cable, depends on the intended voltage level of the end application cable and can be chosen accordingly.

The present invention does also relate to use of a thermoplastic polyethylene having a chlorine content which is less than X, wherein X is as defined herein; or of a polymer composition being, or comprising, the power cable polymer composition as described herein; for producing at least one layer, for example, an insulation layer, of a power cable comprising a conductor surrounded by at least an inner semiconductive layer, an insulation layer and an outer semiconductive layer, in that order.

The present invention does also further relate to use of a polymer composition being, or comprising, the power cable polymer composition as described herein, for producing at least one layer, for example, an insulation layer, of a power cable comprising a conductor surrounded by at least an inner semiconductive layer, an insulation layer and an outer semiconductive layer, in that order.

Further, the present invention does also relate to use of a thermoplastic polyethylene having a chlorine content which is less than X, wherein X is as defined herein; or of a polymer composition being, or comprising, the power cable polymer composition as described herein; for producing at least one layer, for example, an insulation layer, of a power cable which is a direct current (DC) power cable.

Even further, the present invention does also relate to use of a polymer composition being, or comprising, the power cable polymer composition as described herein, for producing at least one layer, for example, an insulation layer, of a power cable which is a direct current (DC) power cable.

In a further embodiment of the present invention, a use of the power cable polymer composition, as described herein, for producing an insulation layer of a power cable is disclosed, wherein the insulation layer comprises, for example, consists of, a thermoplastic polyethylene having a chlorine content which is less than X, wherein X is as defined herein, or comprises, for example, consists of, a power cable polymer composition, as described herein.

FIG. 1 shows a schematic picture of the measurement setup used in the DC conductivity method as described under "Determination methods". Explanation of the numbered parts "1-6": "1" Connection to high voltage; "2" Measuring electrode; "3" Electrometer/Pico Ammeter; "4" Brass electrode; "5" Test sample, i.e. polymer composition; "6" Si-rubber.

Experimental Part

Determination Methods

Unless otherwise stated in the description or experimental part the following methods were used for the property determinations.

wt %: % by weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene. MFR may be determined at different loadings such as 2.16 kg ($MFR_2$) or 21.6 kg ($MFR_{21}$).

Density

Low density polyethylene (LDPE): The density was measured according to ISO 1183-2. The sample preparation was executed according to ISO 1872-2 Table 3 Q (compression moulding).

The single site polyethylene (SSPE) in Examples 2 and 3 (low pressure process polyethylene), and Example 4, Example 5, chromium catalyst polyethylene (low pressure process polyethylene): Density of the Examples 2, 3, 4 and 5 were measured according to ISO 1183/1872-2B.

Chlorine Content Calculation

The chlorine content has been estimated by theoretical calculation. For the comparative example, the chlorine content can either be measured via analytical techniques, well described in the literature, or can be calculated based on the amount of Ti and Mg present in the catalyst. For the inventive examples 2 and 3, the amount of chlorine is calculated based on the amount of metal present in the catalyst formulation. Further, in relation to the inventive example 4 and example 5, the chromium catalyst does not contain any chlorine.

Furthermore, by knowing the amount of chlorine present in the catalyst and the productivity, i.e. the amount of polymer produced by amount of catalyst, the residual amount of chlorine in the final polymer composition can be easily calculated.

DC Conductivity Method

Electrical conductivity measured at 70° C. and 30 kV/mm mean electric field on a 1 mm plaque sample consisting of the polymer composition.

Plaque Sample Preparation:

The plaques are compression moulded from pellets of the test polymer composition. The final plaques have a thickness of 1 mm and a diameter of 260 mm.

The plaques are compression moulded at 130° C. for 600 s at a pressure of 2.6 MPa. Thereafter the temperature is increased and reaches 180° C. after 5 min. The temperature is then kept constant at 180° C. for 1000 s. Finally the temperature is decreased at a cooling rate 15° C./min until room temperature is reached when the pressure is released.

Measurement Procedure:

A high voltage source is connected to the upper electrode in order to apply voltage over the test sample. The resulting current through the sample is measured with an electrometer/picoammeter. The measurement cell is a three electrodes system with brass electrodes placed in a heated oven circulated with dried compressed air to maintain constant humidity level. The diameter of the measurement electrode is 100 mm.

The applied voltage is 30 kV DC meaning a mean electric field of 30 kV/mm. The temperature is 70° C. and the whole experiments last for 24 hours including heating to the test temperature. The current through the plaque is logged. The current after 24 hours is used to calculate the conductivity of the test sample i.e. the plaque consisting of the polymer composition to be tested.

Polymer Compositions:

Example 1 (Comparative)

A commercially available HDPE, i.e. HE6068, supplied by Borealis Finland, which is a bimodal high density polyethylene having an $MFR_2$ of 1.7 g/10 min and a density of 944 kg/m$^3$.

Example 2 (Inventive)

A polyethylene polymerised by means of a single site catalyst in solution, i.e. a thermoplastic polyethylene having a chlorine content which is less than X, in accordance with the present invention, is commercially available from Borealis Plastomers (NL) under the tradename QUEO8230. The QUEO8230 is a very low density polyethylene (1-octene as the comonomer), has an $MFR_2$ of 30 g/10 min (190° C./2.16 kg) and a density of 882 kg/m$^3$.

Example 3 (Inventive)

A single site polyethylene, i.e. a thermoplastic polyethylene having a chlorine content which is less than X, in accordance with the present invention, was prepared as described below.

Single Site Catalyst

Possible Preparation of the Single Site Catalyst 16.4 kg methylalumoxane in toluene (30 weight-%, supplied by Albemarle) was mixed with 8.5 kg dry toluene and added to 0.46 kg di(n-benzyl)di(n-butylcyclopentadienyl) hafnium in toluene (67.9 wt %) and stirred at room temperature for 20 min. The obtained solution was added dropwise during 45 min to 10 kg activated silica (commercial silica carrier, XPO2485A, having an average particle size 20 μm, supplier: Grace) and stirred at room temperature for 3 hours. The solvents were evaporated off under nitrogen flow at 50° C. to obtain the supported catalyst. The obtained catalyst had an Al/Hf ratio of 200 mol/mol; a Hf-concentration of 0.42 wt % and an Al-concentration of 14.0 wt %.

Preparation of Single Site Polyethylene

A single site polyethylene i.e. a thermoplastic polyethylene having a chlorine content which is less than X, in accordance with the present invention, was prepared using in addition to prepolymerisation reactor, a slurry-loop reactor as well as a gas phase reactor. The prepolymerisation stage was carried out in slurry in a 50 dm$^3$ loop reactor under conditions and using feeds of catalyst (as prepared above), monomers, antistatic agent and diluent (propane ($C_3$)) as disclosed in Table 1. The obtained slurry together with the prepolymerised catalyst was introduced into a 500 dm$^3$ loop reactor to carry out the actual polymerisation. The polymer slurry was withdrawn from the loop reactor and transferred into a flash vessel operated at 3 bar pressure and 70° C. temperature where the hydrocarbons were substantially removed from the polymer. The polymer was then introduced into a gas phase reactor. The conditions and feeds/feed ratio in loop and gas phase polymerisation steps are disclosed in Table 2 and 3

TABLE 1

Process conditions in the Prepolymerisation (inventive example 3)

|  |  | Example 3 (Inventive) |
|---|---|---|
| Temperature | [° C.] | 60 |
| Pressure | [bar] | 62 |
| Catalyst Feed | [g/h] | 38 |
| Antistatic feed | [g/h] | 7 |
| C2 feed | [kg/h] | 2 |
| C4 feed | [g/h] | 50 |
| C3 feed | [kg/h] | 32 |

TABLE 2

Process condition in the Loop reactor and properties (inventive example 3)

| | | Example 3 (Inventive) |
|---|---|---|
| Temperature | [° C.] | 85 |
| Pressure | [bar] | 58 |
| C2 feed | [kg/h] | 33 |
| H2 feed | [g/h] | 7.9 |
| C4 feed | [kg/h] | 1.7 |
| C3 feed | [kg/h] | 71 |
| H2/C2 ratio | [mol/kmol] | 0.55 |
| C4/C2 ratio | [mol/kmol] | 91 |
| C4/C2 feed ratio | [g/kg] | 0.05 |
| Production rate | [kg/h] | 29.9 |
| Split | [wt %] | 49 |
| MFR$_2$ | [g/10 min] | 100 |
| Density | [kg/m3] | 939 |

TABLE 3

Process conditions in the Gas phase reactor and properties (inventive example 3)

| | | Example 3 (Inventive) |
|---|---|---|
| Temperature | [° C.] | 80 |
| Pressure | [bar] | 20 |
| C2 feed | [kg/h] | 39.3 |
| H2 feed | [g/h] | 0 |
| C4 feed | [kg/h] | 0 |
| C6 feed | [kg/h] | 1.2 |
| C2 concentration | [mol %] | 21.7 |
| H2/C2 ratio | [mol/kmol] | 0 |
| C4/C2 ratio | [mol/kmol] | 0 |
| C6/C2 ratio | [mol/kmol] | |
| C4/C2 feed ratio | [g/kg] | 0 |
| C6/C2 feed ratio | [g/kg] | |
| Production rate | [kg/h] | 32 |
| Split | [wt %] | 51 |
| MFR$_2$ | [g/10 min] | 2.5 |
| Density | [kg/m3] | 934 |

For all the tables:
C2: ethylene
C3: propane
H2: hydrogen
C4: 1-butene
C6: 1-hexene The powder produced after the multistage polymerisation was compounded and pelletised using an extruder and the medium density polyethylene obtained had a MFR$_2$=2.2 dg/10 min and a density=935.8 kg/m$^3$.

Example 4 (Inventive) and Example 5 (Inventive)

A chromium catalyst polyethylene, i.e. a thermoplastic polyethylene having a chlorine content which is less than X, in accordance with the present invention, was prepared as described below.

Chromium Catalyst

Commercially available chromium catalyst BCF03E supplied from Grace Catalyst AB. was used for Example 4 (Inventive).

Commercially available chromium catalyst BCF01E supplied from Grace Catalyst AB. was used for Example 5 (Inventive)

Chromium catalyst polyethylene: The chromium catalyst polyethylene (1-hexene as the comonomer) for example 4 and the chromium catalyst polyethylene (1-butene as the comonomer) for example 5 was prepared with the above chromium catalysts and as described below.

Fluid Bed Gas Phase Example

The following provide a fluid bed gas phase example for producing the Example 4 (Inventive), i.e. a thermoplastic polyethylene having a chlorine content which is less than X, where the conditions for the polymerisation of Table 4 may be used. In a fluidized bed gas phase reactor an olefin is polymerised in the presence of a polymerisation catalyst in an upwards moving gas stream. The reactor typically contains a fluidized bed comprising the growing polymer particles containing the active catalyst located above a fluidization grid. The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. One or more of the above-mentioned components may be continuously added into the fluidization gas to compensate for losses caused, among other, by reaction or product withdrawal. From the inlet chamber the gas flow is passed upwards through a fluidization grid into the fluidized bed. The fluidization gas passes through the fluidized bed. The superficial velocity of the fluidization gas must be higher than the minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas.

When the fluidization gas is contacted with the bed containing the active catalyst, the reactive components of the gas, such as monomers and chain transfer agents, react in the presence of the catalyst to produce the polymer product, i.e. the chromium catalyst polyethylene. At the same time the gas is heated by the reaction heat. The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. The condensing agents are non-polymerisable components, such as n-pentane, isopentane, n-butane or isobutane, which are at least partially condensed in the cooler. The gas is then compressed and recycled into the inlet chamber of the reactor. Prior to the entry into the reactor fresh reactants are introduced into the fluidization gas stream to compensate for the losses caused by the reaction and product withdrawal. It is generally known how to analyze the composition of the fluidization gas and to introduce the gas components to keep the composition constant. The actual composition is determined by the desired properties of the product and the catalyst used in the polymerisation.

The catalyst may be introduced into the reactor in various ways, either continuously or intermittently. The polymeric product may be withdrawn from the gas phase reactor either continuously or intermittently. Combinations of these methods may also be used.

Typically the fluidized bed polymerisation reactor is operated at a temperature within the range of from 50 to 110° C., preferably from 65 to 110° C. The pressure is suitably from 10 to 40 bar, preferably from 15 to 30 bar.

TABLE 4

Process conditions for fluid bed gas phase polymerisation (Example 4 (inventive)) and Example 5 (Inventive)

|  |  | Example 4 (Inventive) | Example 5 (Inventive) |
|---|---|---|---|
| Temperature | [° C.] | 103 | 106 |
| Ethylene partial pressure | [bar] | 10 | 6.6 |
| H2/C2 | [mol/kmol] | 30 | 30 |
| C6/C2 | [mol/kmol] | 6 | 0 |
| C4/C2 | [mol/kmol] | 0 | 2 |
| MFR$_2$ | [g/10 min] | 1.0 | 0.6 |
| MFR$_{21}$ | [g/10 min] | 62 | 11.5 |
| Density | [kg/m$^3$] | 946 | 951.3 |

For the table 4:
C2: ethylene
H2: hydrogen
C6: 1-hexane
C4: 1-butene

TABLE 5

Polymer compositions and the DC electrical conductivity results:

| Components | Ex 1 comparative | Ex 2 inventive | Ex 3 inventive | Ex 4 inventive | Ex 5 Inventive |
|---|---|---|---|---|---|
| HDPE (HE6068) | 100 | | | | |
| QUEO8230, VLDPE, wt %* | | 100 | | | |
| Single site polyethylene, wt %* | | | 100 | | |
| Ex 4 Chromium catalyst polyethylene, wt %* | | | | 100 | |
| Ex 5 Chromium catalyst polyethylene, wt %* | | | | | 100 |
| Chlorine content, ppm | ~12 | <10 | <0.5 | <0.5 | <0.5 |
| DC conductivity, fS/m | 12.6 | 7 | 0.2 | 4.3 | 7.55 |

Ref is HDPE, i.e. HE6068
*The amounts of polymer composition components in table 5 are based on the combined amount of the used polymer composition components. The amount 100 wt % of polymer in table 5 means that this polymer is the sole polymer component.

As can be seen form table 5, the thermoplastic polyethylenes, having a chlorine content which is less than X, of inventive examples 2, 3, 4 and 5, show excellent low DC conductivity. From inventive example 4 and 5 is it evident that a moderate decrease in density lowers the DC conductivity more than moderate. Inventive example 3 shows even lower DC conductivity compared to example 2 and 4, 5. It has surprisingly been found that a multistage process for polymerisation of polyethylene, suitably with a single site polyethylene polymerisation, gives even lower DC conductivity. The multistage process for polymerisation of polyethylene is suitably a combination of slurry reactor and gas phase reactor, suitably as described in example 3. The thermoplastic polyethylenes, having a chlorine content which is less than X, in accordance with the present invention, are suitable in the power cable polymer compositions of the invention, e.g. in DC power cables, for example, in HV DC power cables.

The invention claimed is:

1. A power cable insulation polymer composition comprising a single site thermoplastic polyethylene having a chlorine content which is less than X, wherein X is 3.0 ppm; wherein the thermoplastic polyethylene is multimodal, and is a medium density ethylene copolymer or a high density ethylene homopolymer or copolymer.

2. A power cable insulation polymer composition according to claim 1, wherein the power cable insulation polymer composition is a thermoplastic power cable insulation polymer composition.

3. A power cable insulation polymer composition according to claim 1, wherein the power cable insulation polymer composition is a high voltage (HV) and/or extra-high voltage (EHV) power cable insulation polymer composition.

4. A power cable insulation polymer composition according to claim 1, wherein the power cable insulation polymer composition is a high voltage direct current (HV DC) and/or an extra high voltage direct current (EHV DC) power cable insulation polymer composition.

5. A power cable insulation polymer composition according to claim 1, wherein the power cable insulation polymer composition has a DC electrical conductivity of 45 fS/m or less.

6. A power cable insulation polymer composition according to claim 1, wherein the power cable insulation polymer composition has a DC electrical conductivity of 10.0 fS/m or less.

7. A power cable insulation polymer composition according to claim 1, wherein X is 2.5 ppm.

8. A power cable which power cable comprises a polymer composition being, or comprising, the power cable insulation polymer composition according to claim 1.

9. A power cable polymer insulation, for example, a high voltage direct current (HV DC) and/or an extra high voltage direct current (EHV DC) power cable insulation, which power cable insulation comprises a polymer composition being, or comprising, the power cable insulation polymer composition according to claim 1.

10. A method of producing a power cable with the insulation polymer composition of claim 1 comprising: producing at least one layer of a power cable with the composition, said power cable comprising a conductor surrounded by at least an inner semiconductive layer, an insulation layer and an outer semiconductive layer, in that order.

11. The method according to claim 10, wherein the power cable is a direct current (DC) power cable.

12. The method according to claim 10, wherein the insulation layer comprises a power cable insulation polymer composition comprising a single site thermoplastic polyethylene having a chlorine content which is less than X, wherein X is 10 ppm; wherein the thermoplastic polyethylene is multimodal, and is a medium density ethylene copolymer or a high density ethylene homopolymer or copolymer.

13. The power cable insulation polymer composition according to claim 1, wherein the power cable insulation polymer composition does not comprise an acid scavenger.

14. The power cable insulation polymer composition according to claim 1, wherein the power cable insulation polymer composition does not comprise an ion scavenger.

15. The power cable insulation polymer composition according to claim 1, wherein the thermoplastic polyethylene is a medium density ethylene copolymer of ethylene and one or more $C_3$-$C_{20}$ alpha-olefins; or a high density ethylene homopolymer or copolymer of ethylene and one or more $C_3$-$C_{20}$ alpha-olefins.

16. The power cable insulation polymer composition according to claim 1, wherein the thermoplastic polyethylene is the sole polymer component.

17. The power cable insulation polymer composition according to claim 1, wherein the power cable insulation polymer composition has a DC electrical conductivity of 5.0 fS/m or less.

18. The power cable insulation polymer composition according to claim 1, wherein the power cable insulation polymer composition has a DC electrical conductivity of 4.0 fS/m or less.

19. The power cable insulation polymer composition according to claim 1, wherein X is 1.0 ppm.

20. The power cable polymer insulation composition according to claim 2, wherein the power cable insulation polymer composition is a high voltage (HV) and/or extra-high voltage (EHV) power cable insulation polymer composition.

* * * * *